United States Patent
Boergen et al.

(10) Patent No.: US 7,623,414 B2
(45) Date of Patent: Nov. 24, 2009

(54) PARTICLE MOTION VECTOR MEASUREMENT IN A TOWED, MARINE SEISMIC CABLE

(75) Inventors: Lars Boergen, Oslo (NO); Øyvind Teigen, Notodden (NO); Nils Halvor Heieren, Oslo (NO); Vidar A. Husom, Asker (NO); Oeystein Traetten, Asker (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/534,969

(22) Filed: Sep. 25, 2006

(65) Prior Publication Data

US 2007/0195648 A1    Aug. 23, 2007

Related U.S. Application Data

(60) Provisional application No. 60/775,586, filed on Feb. 22, 2006.

(51) Int. Cl.
*G01V 1/20* (2006.01)
*G01V 1/38* (2006.01)

(52) U.S. Cl. .................................................. 367/178

(58) Field of Classification Search .................. 367/24, 367/99, 129, 130, 153, 171–173, 178, 188; 181/10, 12, 110, 112
See application file for complete search history.

(56) References Cited

U.S. PATENT DOCUMENTS

| | | | |
|---|---|---|---|
| 3,283,293 A | 11/1966 | Pavey et al. | 340/7 |
| 4,437,175 A | 3/1984 | Berni | 367/24 |
| 4,477,887 A | 10/1984 | Berni | |
| 4,486,865 A | 12/1984 | Ruehle | 367/24 |
| 4,520,467 A | 5/1985 | Berni | 367/24 |
| 4,618,949 A | 10/1986 | Lister | 367/171 |
| 4,827,459 A | 5/1989 | Franklin | 367/158 |
| 4,935,903 A | 6/1990 | Sanders et al. | 367/24 |
| 4,979,150 A | 12/1990 | Barr | 367/24 |
| 5,235,554 A | 8/1993 | Barr et al. | 367/13 |

(Continued)

FOREIGN PATENT DOCUMENTS

EP    89700 B1    9/1983

(Continued)

OTHER PUBLICATIONS

UK Search Report for Application No. GB0703457.2 dated Jun. 11, 2007.

(Continued)

*Primary Examiner*—Dan Pihulic
(74) *Attorney, Agent, or Firm*—Jeffrey A. Pyle; Richard V. Wells; Jeffrey E. Griffin (57) ABSTRACT

A particle motion sensor, includes: a sensing element capable of sensing a particle motion vector from a change in position thereof, and a packing material in which the sensing element is positioned, wherein the particle motion sensor is symmetric about its longitudinal axis and has a center of gravity coincident with its volumetric center. An apparatus includes a streamer; a plurality of acoustic sensors distributed along the streamer; and a plurality of particle motion sensors distributed along the streamer, at least one particle motion sensor being symmetric about its longitudinal axis and having a center of gravity coincident with its volumetric center.

41 Claims, 3 Drawing Sheets

U.S. PATENT DOCUMENTS

| | | | |
|---|---|---|---|
| 5,384,753 A | 1/1995 | Sanders | 367/163 |
| 5,392,258 A | 2/1995 | Gabrielson et al. | |
| 5,723,790 A | 3/1998 | Andersson | |
| 6,172,940 B1 | 1/2001 | Mcconnell et al. | 367/178 |
| 6,370,084 B1 | 4/2002 | Cray | 367/141 |
| 6,453,745 B1 | 9/2002 | Jalkanen | 73/514.09 |
| 6,512,980 B1 | 1/2003 | Barr | 702/1 |
| 7,239,577 B2 * | 7/2007 | Tenghamn et al. | 367/171 |
| 7,322,236 B2 * | 1/2008 | Combi et al. | 73/488 |
| 2003/0117025 A1 * | 6/2003 | Rouquette | 307/147 |
| 2004/0042341 A1 | 3/2004 | Tenghamn et al. | 367/15 |
| 2004/0156267 A1 * | 8/2004 | O'Brien et al. | 367/149 |
| 2005/0013194 A1 | 1/2005 | Vaage et al. | 367/24 |
| 2005/0160814 A1 | 7/2005 | Vaganov et al. | 73/514.01 |
| 2005/0194201 A1 * | 9/2005 | Tenghamn et al. | 181/112 |
| 2005/0195686 A1 | 9/2005 | Vaage et al. | 367/21 |
| 2005/0202585 A1 | 9/2005 | Eskridge | 438/50 |
| 2006/0139652 A1 * | 6/2006 | Berthold | 356/478 |
| 2007/0195648 A1 * | 8/2007 | Borgen et al. | 367/178 |
| 2008/0253225 A1 * | 10/2008 | Welker et al. | 367/19 |

FOREIGN PATENT DOCUMENTS

| | | | |
|---|---|---|---|
| EP | 0089700 | | 9/1988 |
| EP | 460789 B1 | | 12/1991 |
| EP | 0460789 | | 5/1995 |
| GB | 1 088 469 | | 10/1967 |
| GB | 1088469 | | 10/1967 |
| GB | 2 392 495 | | 3/2004 |
| GB | 2392495 A | | 3/2004 |
| GB | 2 411 723 | | 9/2005 |
| GB | 2 421 078 | | 6/2006 |
| GB | 2 423 362 | | 8/2006 |
| GB | 2 435 513 | | 8/2007 |
| GB | 2435513 A * | | 8/2007 |
| WO | WO 98/28636 | | 7/1998 |
| WO | WO98/28636 | | 7/1998 |
| WO | WO 00/20895 | | 4/2000 |
| WO | WO00/20895 | | 4/2000 |
| WO | WO 02/12922 | | 2/2002 |
| WO | WO02/12922 | | 2/2002 |
| WO | WO/03/058276 | | 7/2003 |
| WO | WO 03058276 A2 | | 7/2003 |
| WO | WO2004/081583 | | 9/2004 |
| WO | WO 2004081583 A1 | | 9/2004 |

OTHER PUBLICATIONS

Amundsen, L., Roesten, T., Robertsson, J. O. A., and Kragh, E., Rough-sea deghosting of single streamer seismic data using pressure gradient approximations, Geophysics,70, V1-V9, 2005.

MacKay, D. J. C., 2003, Information theory, inference and learning algorithms, pp. 549-551.

Muijs, R., Holliger, K., and Robertsson, J. O. A., Data-driven adaptive decomposition of multicomponent seabed recordings, 73rd Annual Society of Exploration Geophysicists (SEG) Meeting, Dallas, 2003.

Robertsson, J. O. A., and Kragh, E., Rough sea deghosting using a single streamer and a pressure gradient approximation, Geophysics, 67, 2005-2011, 2002.

Schalkwijk, K., 2001, Decomposition of multicomponent ocean-bottom data into P- and S-waves: Ph.D. thesis, Delft University, Netherlands. (pp. 41-43 Only).

UK Search Report for Application No. GB0703457.2 dated Jun. 8, 2007.

Amundsen, L., Roesten, T., Robertsson, J.O.A., and Kragh E. Rough-sea deghosting of single streamer seismic data using pressure gradient approximations, Geophysics, 70, VI-V9, 2005.

MacKay, D.J.C., 2003, Information theory, inference and learning algorithms, pp. 549-551.

Muijs, R., Holliger, K., and Robertsson, J.O.A., Data-driven adaptive decomposition of multi-component seabed recordings, 73rd Annual Society of Exploration Geophysicists (SEG) Meeting, Dallas, 2001.

Robertsson, J.O.A., and Kragh, E. Rough-sea deghosting using a single streamer and a pressure gradient approximation, Geophysics, 67, 2005-2011, 2002.

Schalkwijk, K., 2001, Decomposition of multicomponent ocean-bottom data into P- and S-waves; Ph.D. thesis, Delft University, Netherlands (pp. 41-43 Only).

* cited by examiner

PARTICLE MOTION VECTOR MEASUREMENT IN A TOWED, MARINE SEISMIC CABLE

The current non-provisional patent application claims the priority of a provisional patent application, Ser. No. 60/775,586, filed on Feb. 22, 2006 by the same inventor, with the same title.

BACKGROUND OF THE INVENTION

1. Field of the Invention

The present invention pertains to marine seismic surveying, and, more particularly, to particle vector measurement in a marine seismic survey.

2. Description of the Related Art

In one kind of marine seismic survey, a survey vessel tows an array of seismic cables, frequently referred to as "streamers," along a predetermined course. As the vessel tows the array, a seismic source, such as an airgun or a vibroseis source, imparts an acoustic wave into the water. The acoustic wave travels through the water and is eventually reflected by various geological features. The reflections travel back up through the water to the streamers. The streamers include acoustic sensors, or "hydrophones," distributed along its length. As the reflections pass over the acoustic receivers, the receivers sense the magnitude of the passing wavefront. The acoustic receivers then transmit data representing the detected magnitude of the passing wavefront back up the seismic cables to the survey vessel for collection.

The reflections continue propagating through the water past the acoustic receivers until they reach the water's surface. At the surface, the reflections are reflected once again. These reflections of the reflections are sometimes called "multiples," short for multiple reflections, or "ghost reflections." The multiples travel back down through the water and will also pass over the acoustic receivers. The acoustic receivers once again sense the magnitude of the passing wavefront. The acoustic receivers also once again transmit data representing the detected magnitude over the seismic cables for collection aboard the survey vessel.

Thus, the survey data contains not only data obtained from the initial reflections, but also data collected from the multiples. The data from the multiples is undesirable because it is not representative of the geological formations being surveyed. Instead, data from the multiples is representative of the surface. More technically, the multiples "destructively interfere" with the reflections. In short, the seismic sensors sense the magnitude of any passing wavefront without regard to the direction of its travel.

Conventional approaches address this problem in two ways. One way is to try and mitigate the influence of multiples during the survey. A second way is to try to back out the multiples data during processing. Both approaches have their drawbacks.

Mitigating multiples during the survey frequently involves positioning the components of the survey in a particular fashion. For example, ghost reflections can often be largely canceled out if the seismic cables are towed at a depth of approximately 4-5 meters. However, positioning streamers can be very difficult. Streamers may be several kilometers long. This typically results in a rather large inertia that can make the streamer difficult to control. The streamer may also be subjected to very different environmental conditions—such as wind and current—along its length. This means that the streamer may frequently be inaccurately positioned so that the adverse effect of the multiples is not fully mitigated.

Backing out the multiples during processing typically involves predicting the actual multiples from a number of factors. A variety of multiples prediction techniques are known to the art. However, as with all prediction techniques, assumptions and generalizations are made. While these generalizations and assumptions may be statistically viable, they may apply to any given survey—or any given portion of a survey—with more or less accuracy. In some surveys, they consequently may have a harmful effect or otherwise create inaccuracies. Furthermore, this approach lengthens complicated processing, thereby driving up costs. It would therefore be desirable to mitigate the effect of multiples without having to expend the time, effort and resources to continuously monitor and position the seismic cables. It would also be desirable to be able to mitigate the efforts of multiples through actual measurements rather than predictions. Consequently, it would be desirable to not measure the magnitude of any given wavefront passing the acoustic sensors, but also its vector, or polarization.

The present invention is directed to resolving, or at least reducing, one or all of the problems mentioned above.

SUMMARY OF THE INVENTION

The present invention, in its various aspects and embodiments, includes a particle motion sensor, comprising: a sensing element capable of sensing a particle motion vector from a change in position thereof and a packing material in which the sensing element is positioned, wherein the particle motion sensor is symmetric about its longitudinal axis and has a center of gravity coincident with its volumetric center. It also includes a particle motion sensor, comprising: an accelerometer capable of sensing a particle motion vector from a change in position thereof; and a packing material in which the sensing element is positioned.

In a second aspect, the invention includes an apparatus comprising: a streamer; a plurality of acoustic sensors distributed along the streamer; and a plurality of particle motion sensors distributed along the streamer, at least one particle motion sensor being symmetric about its longitudinal axis and having a center of gravity coincident with its volumetric center. It also includes an apparatus comprising: a streamer; a plurality of acoustic sensors distributed along the streamer; and a plurality of particle motion sensors distributed along the streamer. At least one of these particle motion sensors includes an accelerometer capable of sensing a particle motion vector from a change in position thereof; and a packing material in which the sensing element is positioned.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1A:
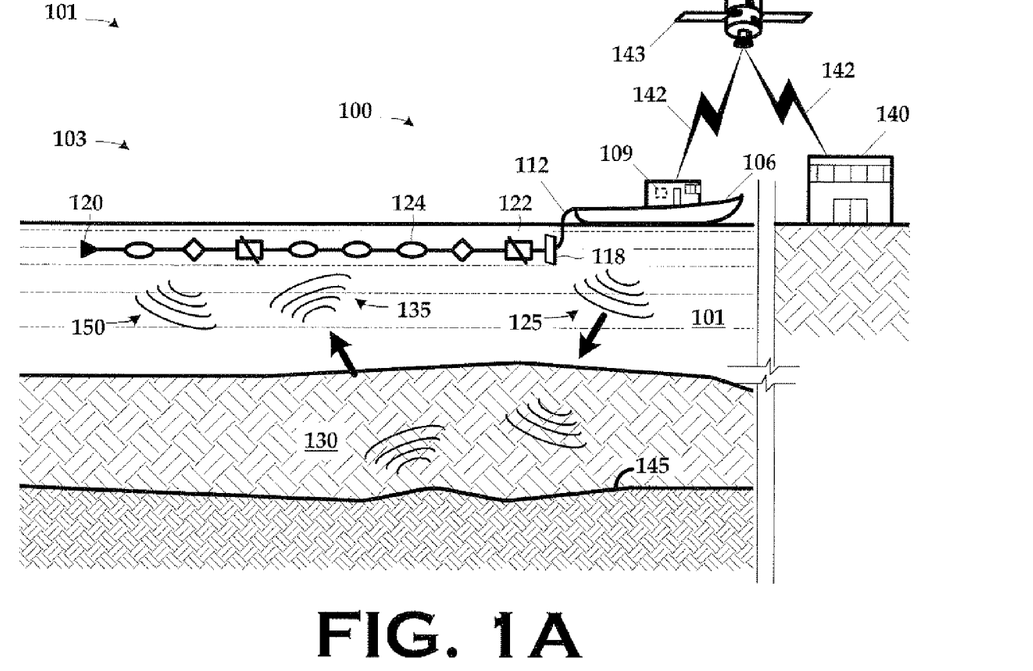
FIG. 1A and FIG. 1B depict a marine seismic survey practiced in accordance with one aspect of the present invention.
Figure 1B:
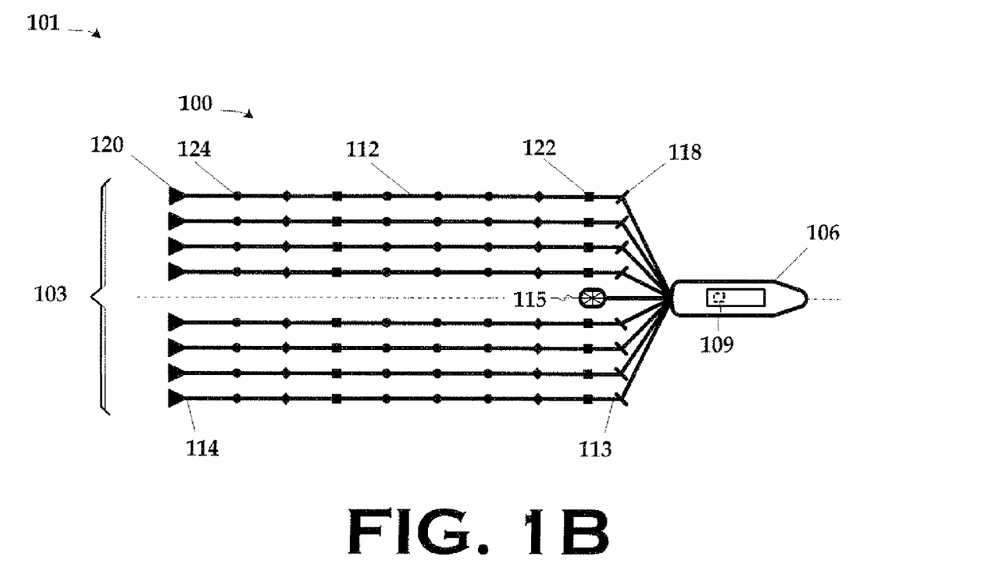

FIG. 1A-FIG. 1B illustrate a survey system 100 in a marine survey 101, both of which are exemplary embodiments of their respective aspects of the present invention. In this particular embodiment, the survey system 100 generally includes an array 103 towed by a survey vessel 106 on board of which is a computing apparatus 109. The towed array 103 comprises eight marine seismic cables, or streamers, 112 (only one indicated) that may, for instance, each be 6 km long. Note that the number of streamers 112 in the towed array 103 is not material to the practice of the invention. Thus, alternative embodiments may employ different numbers of streamers 112.

A seismic source 115, typically an air gun or an array of air guns, is also shown being towed by the seismic survey vessel 106. Note that in alternative embodiments, the seismic source 115 may not be towed by the survey vessel 106. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum.

At the front of each streamer 112 is a deflector 118 (only one indicated) and at the rear of every streamer 112 is a tail buoy 120 (only one indicated). The deflector 118 horizontally positions the front end 113 of the streamer 112 nearest the seismic survey vessel 106. The tail buoy 120 creates drag at the tail end 114 of the streamer 112 farthest from the seismic survey vessel 106. The tension created on the streamer 112 by the deflector 118 and the tail buoy 120 results in the roughly linear shape of the streamer 112 shown in FIG. 1B.

Located between the deflector 118 and the tail buoy 120 are a plurality of seismic cable positioning devices known as "birds" 122. The birds 122 may be located at regular intervals along the seismic cable, such as every 200 to 400 meters. In this particular embodiment, the birds 122 are used to control the depth at which the streamers 112 are towed, typically a few meters. In one particular embodiment, the steerable birds 122 are implemented with Q-fin.™. steerable birds as are employed by Western Geco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al. ("the 895 application"). However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston ("the 636 application"). In some embodiments, the birds 122 may even be omitted.

Figure 2A:
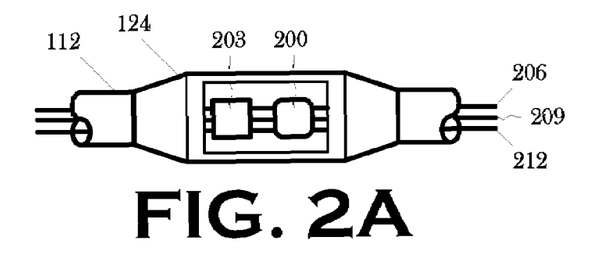
FIG. 2A, FIG. 2B depict two alternative sensor arrangements for the marine seismic survey of FIG. 1A-FIG. 1B.

The streamers 112 also include a plurality of instrumented sondes 124 (only one indicated) distributed along their length. Turning now to FIG. 2A, the instrument sondes 124 house, in the illustrated embodiment, an acoustic sensor 200 (e.g., hydrophones) such as is known to the art, and a particle motion sensor 203. The particle motion sensors 203 measure the not only the magnitude of passing wavefronts, but also their direction. Thus, it would be possible to distinguish data representing upward propagating wavefronts, such as the reflections 135, from the downward propagating wavefronts, such as the multiple reflection 150. Suitable particle motion sensors are known to the art and may be used to implement the particle motion sensors 203. Any suitable particle motion sensor known to the art may be used to implement the particle motion sensor 203.

Figure 3A:
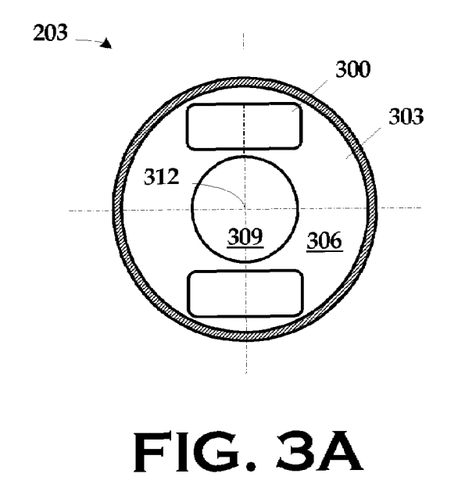
FIG. 3A-FIG. 3B generally and conceptually illustrate one particular embodiment of a particle motion sensor in accordance with the present invention, FIG. 3A being a partial cross-section along line 3A-3A in FIG. 3B.
Figure 3B:
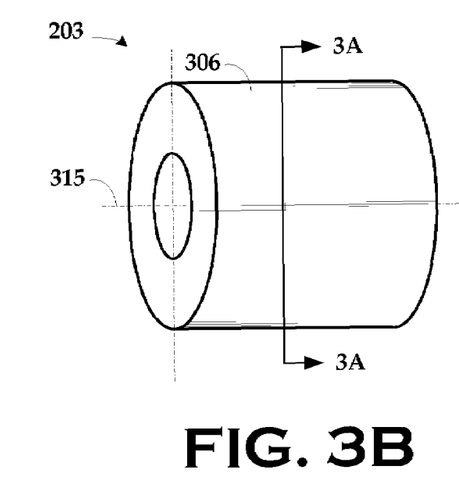

FIG. 3A-FIG. 3B generally and conceptually illustrates how the sensing element 300 of a particle motion sensor 203 may be disposed within a streamer 112 in accordance with the present invention. The sensing element 300 may be, for example, a geophone or an accelerometer. The sensing element is suspended in a fluid 303. The fluid 303 may be a fluid used to fill the seismic streamer 112 if the streamer is a fluid filled streamer. In the illustrated embodiment, the fluid 303 is contained in a pocket 306 of the streamer 112. Exemplary fluids suitable for this purpose in various embodiments and known to the art and include seismic cable oil or some other suitable dielectric fluid.

The sensing element 300 is designed to match the density of the surrounding medium. To match the density of the surrounding medium, the sensing element 300 itself should be packed into a low-density material that compensates for its weight. For the illustrated embodiment, the density of the sensing element 300 is designed to match that of the fluid 303. The density of the fluids such as the fluid 303 are known quantities, or can be readily ascertained. Determination of the fluid density is within the ability of those ordinarily skilled in the art having the benefit of this disclosure.

However, as is apparent from the above discussion, some streamers 112 may be solid in construction or the sensing element 300 may be positioned in a solid material. Exemplary materials suitable for this type of embodiment may include, for example, foamed polymer material, and a polymer with added micro-spheres, or a low density plastic. In these embodiments, the sensing element 300 is designed to match the density of the surrounding medium in which the streamer 112 will be deployed, i.e., the water 111. The density of the water 111 will vary according to factors well known in the art such as salinity, temperature, and depth. Determination of the anticipated density of the surrounding medium should also be well within the ability of those ordinarily skilled in the art having the benefit of this disclosure.

The densities of the sensing element 300, the fluid 303, the water 111, and other such components may vary in relation to a number of factors well known to those skilled in the art. For instance, the density of the water 111 may vary according to temperature, depth, salinity, among other factors. Note that such variation may result in selection of a sensing element 300 that does not exactly match the density of the surrounding medium. This is acceptable, although it will yield results with lesser fidelity. At some point, however, a mismatch between the density of the sensing element 300 and the surrounding medium may become sufficiently great as to nullify the reliability of the data generated.

It is desirable that the particle motion sensor 203 exhibit the same response for a given signal regardless of the angle at which the signal impinges upon it. For the particle motion sensor 203 to show the same response for different signal angles, it should be symmetric about its longitudinal axis 315 center and have co-located center of gravity and volumetric center (i.e., the submerged center of buoyancy) in order to minimize distortion and signal degeneration. In the illustrated embodiment, the center of gravity and the volumetric center are located at the point 312, shown in FIG. 3A, on the longitudinal axis 315, shown in FIG. 3B. This could be achieved by making the particle motion sensing body cylindrical to allow for the seismic cable members (for instance stress member, electric and optical telemetry and power) to pass through the center of the particle sensor body, and still have the volume and gravity center located at the axis of the body.

The embodiment of the particle motion sensor 203 depicted in FIG. 3A-FIG. 3B exhibits these characteristics. It is cylindrical, defining an aperture 309 through which a cable comprising, for example, the power lead 206, command and control line 209, and data line 212, shown in FIG. 2A-FIG. 2B, may pass. Symmetry about the longitudinal axis 315 is provided by the electronics 315, and the center of gravity can be located at the volumetric center 312 by controlling the weight of the electronics 315 appropriately. Note that, in embodiments in which the electronics 315 and sensing element 300 are packaged together, the same effect can be achieved by placing a dummy weight where the electronics 315 are shown in FIG. 3A.

Figure 4:
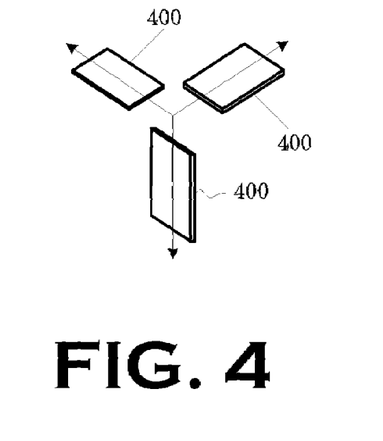
FIG. 4 depicts three single-axis accelerometers oriented orthogonally to each other in the inline, crossline, and vertical directions designated x, y, and z in FIG. 5, respectively, as may be employed in one particular embodiment.
Figure 5:
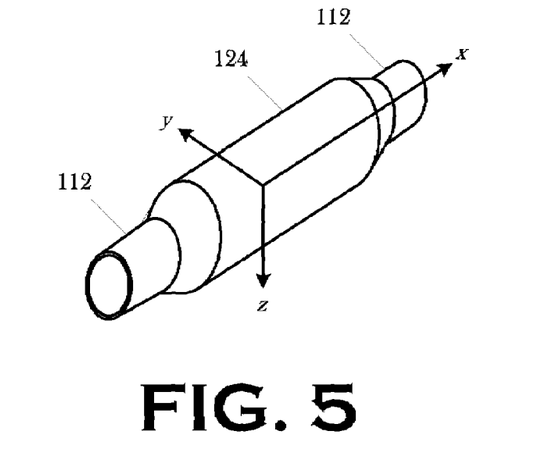
FIG. 5 the inline, crossline, and vertical directions in which the single-axis accelerometers of FIG. 4 are orthogonally oriented.

As was noted above, the sensing element 300 may be implemented as an accelerometer. For instance, in the embodiment of FIG. 3A-FIG. 3B, the sensing element 300 may be implemented in a three-axis, micro electromechanical system ("MEMS") accelerometer. Note, however, that the present invention admits wide variation in the design and implementation of the particle motion sensor 203 in light of the factors mentioned above. For instance, instead of a single, three-axis MEMS accelerometer, alternative embodiments may employ three single-axis MEMS accelerometers assembled perpendicularly to each other. Such an embodiment could then measure acceleration in three independent directions. For example, FIG. 4 shows three single-axis accelerometers 400 oriented orthogonally to each other in the inline, crossline, and vertical directions designated x, y, and z in FIG. 5, respectively. Suitable MEMS, single axis accelerometers are commercially available off the shelf Suitable MEMS accelerometers known to the art. For example, MEMS accelerometers are disclosed in:

U.S. Pat. No. 5,723,790, entitled "Monocrystalline Accelerometer and Angular Rate Sensor and Methods for Making and Using Same", issued Mar. 3, 1998, and naming Gert Andersson as inventor ("the '790 patent")

U.S. patent application Ser. No. 11/042,721, entitled "System and Method for a Three-Axis MEMS Accelerometer", filed Jun. 24, 2005, published Jul. 28, 2005, as Publication No. 2005/0160814 A1, and naming Vladimir Vaganov and Nikolai Belov as inventors;

U.S. patent application Ser. No. 11/000,652, entitled "Micro-Machined Electromechanical System (MEMS) Accelerometer Device Having Arcuately Shaped Flexures", filed Nov. 30, 2004, published Sep. 15, 2005, as Publication No. 2005/0202585 A1, and naming Mark H. Eskridge as inventor; and International Patent Application Serial No. PCT/GB2004/001036, entitled "MEMS Accelerometers", filed Mar. 11, 2004, published Sep. 25, 2004, as Publication No. WO 2004/081583, and naming Diana Hodgins and Joseph Mark Hatt as inventors.

In particular, the '790 patent teaches a three-axis accelerometer that is monocrystalline semiconductor device and employs an inertial mass on the free end of a cantilevered beam in each of three orthogonal directions. However, any suitable MEMS accelerometer may be used.

Returning to FIG. 3A-FIG. 3B, traveling wavefronts will impart a slight force on the streamer 112. Because the sensing element 300 is de-coupled from the streamer 112, the force does not operate equally on the sensing element 300. Thus, the position of the sensing element 300 relative to the streamer 112 will change. For instance, responsive to an upward traveling wavefront, the sensing element 300 will move to a second position close to the cylindrical aperture 309. Responsive to a downward traveling wavefront, the sensing element 300 will move to a second position more removed from the cylindrical aperture 309. The motion sensing element 300 will detect this change in position. More particularly, the sensing element 300 will detect some vector quantity associated with the change in position. For instance, an accelerometer will measure the acceleration and a velocity meter will measure the velocity. Note that acceleration and velocity are both vector quantities defined not only by magnitude, by also by direction.

Figure 6:
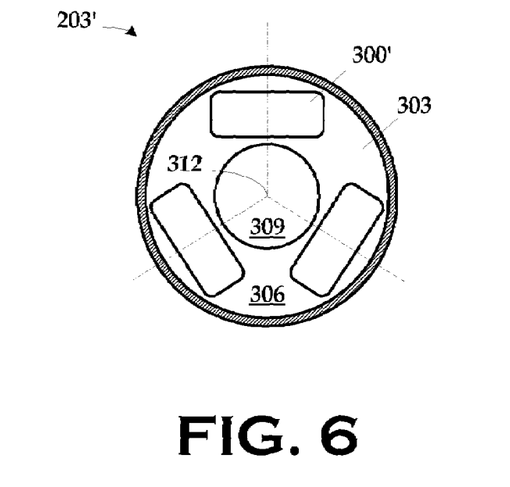
FIG. 6-FIG. 7 depict particle motion sensor embodiments alternative to that in FIG. 3A-FIG. 3B.
Figure 7:
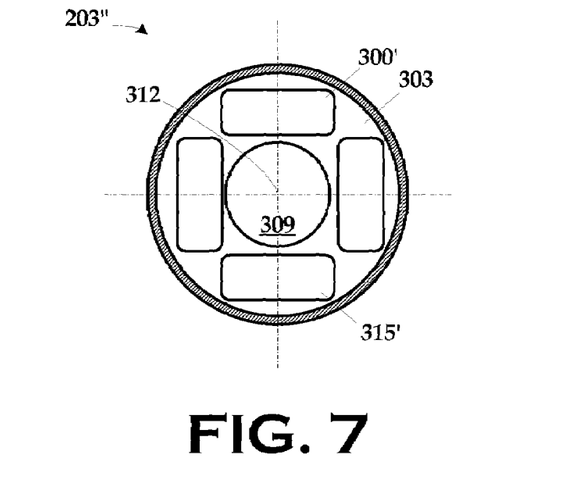

FIG. 6 illustrates one embodiment in which three single-axis accelerometers 303 (only one indicated) are arranged symmetrically around the center 312. In this particular embodiment, the associated electronics are packaged with the accelerometers 303 and so are not separately shown. FIG. 7 illustrates a similar embodiment, but in which the accelerometers 303 (only one indicated) are packaged separately from the associated electronics 315.

Note that in the embodiments of FIG. 3A-FIG. 3B, FIG. 6, and FIG. 7 employ MEMS accelerometers. These devices are typically implemented using semiconductor material and microelectronics manufacturing processes. Thus, they present tremendous advantages over conventional accelerometers in terms of size, cost, and reliability. In particular, the smaller size of MEMS accelerometers permit their integration into a marine seismic cable.

Figure 2B:
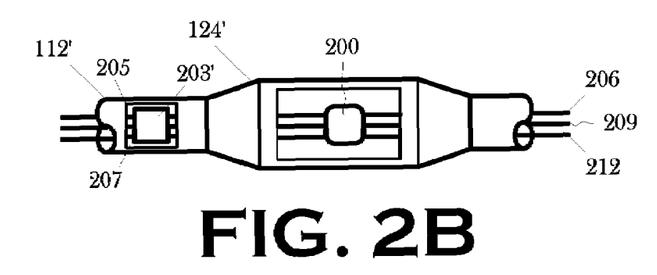

Returning to FIG. 2A, the acoustic sensor 200 and the particle motion sensor 203 are "co-located" in that they are both housed in the sensor sonde 124. Co-location is desirable, inasmuch as it is desirable for the noise measurements to taken as close to the point the seismic data is acquired as is reasonably possible. More distance between the noise data acquisition and the seismic data acquisition will mean less accuracy in the measurement of noise at the point of seismic data acquisition. However, it is not necessary that the particle motion sensor be positioned within the sensor sonde 124. For example, as is shown in FIG. 2B, the particle motion sensor 203' may be positioned in a fluid-filled pocket 205 in the streamer 112. The particle motion sensor 203 is "co-located" with the acoustic sensor 200 in that it is sufficiently proximate that the noise data it acquires reasonably represents the noise component of the acquired seismic data.

The particle motion sensor 203' in FIG. 2B may be, for example, an accelerometer immersed in a fluid 207, such as kerosene. If the major concern is noise levels on the acoustic sensors 200, one can use accelerometer data to correct the hydrophone data. This should be particularly applicable to kerosene pockets in a solid cable. The pressure distribution within the fluid-filled pocket 205 is related to the vibration of the pocket 205. With a good estimate of the noise part (vibration) of the in-line acceleration, one can use this information to correct the pressure measurement. The noise part of the inline acceleration can be isolated using mechanical filtering effects, predicted through experiments, analytical analysis, numerical simulations or from a combination of these. The relation between in-line vibration and the pressure distribution inside a pocket can be found using experiments, analytical analysis, numerical simulations or from a combination of these.

Referring to both FIG. 2A and FIG. 2B, the streamer 112 is shown including a power lead 206, a command and control line 209, and a data line 212. As those in the art will appreciate, a variety of signals are transmitted up and down the streamer 112 during the seismic survey. For instance, power is transmitted to the electronic components (e.g., the acoustic sensor 200 and particle motion sensor 203), control signals are sent to positioning elements (not shown), and data is transmitted back to the vessel 110. To this end, the streamer 112 provides a number of lines over which these signals may be transmitted. Those in the art will further appreciate that there are a number of techniques that may be employed that may vary the number of lines used for this purpose. The illustrated embodiment employs three leads dedicated to the three functions for simplicity of illustration and so as not to obscure the present invention. Furthermore, the streamer 112 will also typically include other structures, such as strengthening members (not shown), that are omitted for the sake of clarity.

Returning to FIG. 1A and FIG. 1B, the computing apparatus 109 interfaces with the navigation system (not shown) of the survey vessel 106. From the navigation system, the computing apparatus 109 obtains estimates of system wide parameters, such as the towing direction, towing velocity, and current direction and measured current velocity. In the illustrated embodiment, the computing apparatus 109 monitors the actual positions of each of the birds 122 and is programmed with the desired positions of or the desired minimum separations between the streamers 112. The horizontal positions of the birds 122 can be derived using various techniques well known to the art. The vertical positions, or depths, of the birds 122 are typically monitored using pressure sensors (not shown) attached to the birds 122.

The geological formation 130 presents a seismic reflector 145. As those in the art having the benefit of this disclosure will appreciate, geological formations under survey can be much more complex. For instance, multiple reflectors presenting multiple dipping events may be present. FIG. 1A and FIG. 1B omit these additional layers of complexity for the sake of clarity and so as not to obscure the present invention.

Still referring to FIG. 1A-FIG. 1B, the seismic source 115 generates a plurality of seismic survey signals 125 in accordance with conventional practice as the survey vessel 106 tows the streamers 112 across the area to be surveyed in a predetermined pattern. The seismic survey signals 125 propagate and are reflected by the subterranean geological formation 130. The invention may nevertheless be practiced in the presence of such complexity. The receivers detect the reflected signals 135 from the geological formation 130 in a conventional manner. The instruments in the sondes 124 then generate data representative of the reflections 135, and the seismic data is embedded in electromagnetic signals.

The signals generated by the receivers are communicated to the computing apparatus 109. The computing apparatus 109 collects the seismic data for processing. The computing apparatus 109 is centrally located on the survey vessel 106. However, as will be appreciated by those skilled in the art, various portions of the computing apparatus 109 may be distributed in whole or in part, e.g., across the seismic recording array 103, in alternative embodiments.

The computing apparatus 109 may process the seismic data itself, store the seismic data for processing at a later time, transmit the seismic data to a remote location for processing, or some combination of these things. Typically, processing occurs on board the survey vessel 106 or at some later time rather than in the survey vessel 106 because of a desire to maintain production. The data may therefore be stored on a portable magnetic storage medium (not shown) or wirelessly transmitted from the survey vessel 106 to a processing center 140 for processing in accordance with the present invention. Typically, in a marine survey, this will be over satellite links 142 and a satellite 143. Note that some alternative embodiments may employ multiple data collection systems 120.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A particle motion sensor, comprising:
   a sensing element capable of sensing a particle motion vector from a change in position thereof, and
   a packing material in which the sensing element is positioned;
   wherein the particle motion sensor is symmetric about its longitudinal axis and has a center of gravity coincident with its volumetric center.

2. The particle motion sensor of claim 1, wherein the sensing element comprises a velocity meter or an accelerometer.

3. The particle motion sensor of claim 2, wherein the accelerometer comprises a three-axis, micro electro-mechanical system accelerometer.

4. The particle motion sensor of claim 2, wherein the sensing element comprises three single-axis, orthogonally oriented, micro electro-mechanical system accelerometers.

5. The particle motion sensor of claim 1, wherein the packing material comprises:
   a fluid;
   a deformable, expanded foam body;
   a polymer with added micro-spheres; or
   a low density plastic.

6. An apparatus comprising:
   a streamer;
   a plurality of acoustic sensors distributed along the streamer; and a plurality of particle motion sensors distributed along the streamer, at least one particle motion sensor being symmetric about its longitudinal axis and having a center of gravity coincident with its volumetric center.

7. The apparatus of claim 6, wherein the particle motion sensor includes:
a sensing element electrically communicating with, but de-coupled from, the streamer and capable of sensing a particle motion vector from a change in position thereof; and
a packing material in which the sensing element is positioned.

8. The apparatus of claim 6, wherein each of the particle motion sensors is co-located with one of the acoustic sensors.

9. The apparatus of claim 6, wherein the acoustic sensors comprise a plurality of hydrophones.

10. The apparatus of claim 7, wherein the sensing element comprises a velocity meter or an accelerometer.

11. The apparatus of claim 10, wherein the accelerometer comprises a three-axis, micro electro-mechanical system accelerometer.

12. The apparatus of claim 10, wherein the sensing element comprises three single-axis, orthogonally oriented, micro electro-mechanical system accelerometers.

13. The apparatus of claim 7, wherein the packing material comprises:
a fluid;
a deformable, expanded foam body;
a polymer with added micro-spheres; or
a low density plastic.

14. The apparatus of claim 6, further comprising an acoustic source.

15. A particle motion sensor, comprising:
an accelerometer capable of sensing a particle motion vector from a change in position thereof, and
a packing material in which the accelerometer is positioned;
wherein the particle motion sensor is symmetric about its longitudinal axis and has a center of gravity coincident with its volumetric center.

16. The particle motion sensor of claim 15, wherein the accelerometer comprises one of three single-axis, orthogonally oriented, micro electro- mechanical system accelerometers.

17. The particle motion sensor of claim 15, wherein the packing material comprises: a fluid;
a deformable, expanded foam body;
a polymer with added micro-spheres; or
a low density plastic.

18. An apparatus comprising:
a streamer;
a plurality of acoustic sensors distributed along the streamer; and
a plurality of particle motion sensors distributed along the streamer, at least one particle motion sensor being symmetric about its longitudinal axis, having a center of gravity coincident with its volumetric center, and including:
an accelerometer capable of sensing a particle motion vector from a change in position thereof; and
a packing material in which the sensing element is positioned.

19. The apparatus of claim 18, wherein each of the particle motion sensors is co-located with one of the acoustic sensors.

20. The apparatus of claim 18, wherein the acoustic sensors comprise a plurality of hydrophones.

21. The apparatus of claim 18, wherein the accelerometer comprises a three-axis, micro electro-mechanical system accelerometer.

22. The apparatus of claim 18, wherein the accelerometer comprises one of three single-axis, orthogonally oriented, micro electro-mechanical system accelerometers.

23. The apparatus of claim 18, wherein the packing material comprises:
a fluid;
a deformable, expanded foam body;
a polymer with added micro-spheres; or
a low density plastic.

24. The apparatus of claim 18, further comprising an acoustic source.

25. The particle motion sensor of claim 15, wherein the accelerometer comprises a three-axis, micro electro-mechanical system accelerometer.

26. A particle motion sensor for use in a streamer, the particle motion sensor comprising:
a packing material; and
a micro electro-mechanical system accelerometer disposed within the packing material;
wherein the particle motion sensor is symmetric about its longitudinal axis and has a center of gravity coincident with its volumetric center.

27. The particle motion sensor of claim 26, wherein the accelerometer comprises a three-axis, micro electro-mechanical system accelerometer.

28. The particle motion sensor of claim 26, wherein the accelerometer comprises one of three single-axis, orthogonally oriented, micro electro-mechanical system accelerometers.

29. The particle motion sensor of claim 26, wherein the packing material comprises:
a fluid;
a deformable, expanded foam body;
a polymer with added micro-spheres; or
a low density plastic.

30. The particle motion sensor of claim 26, wherein the micro electro-mechanical system accelerometer comprises a monocrystalline semiconductor device.

31. The particle motion sensor of claim 26, wherein the micro electro-mechanical system accelerometer comprises an inertial mass on the free end of a cantilevered beam.

32. A particle motion sensor for measuring seismic wavefield in water, comprising:
a sensing element capable of sensing a particle motion vector from a change in position thereof; and
a packing material in which the sensing element is positioned;
wherein the sensing element is a velocity meter or an accelerometer comprising a micro electro-mechanical system and the particle motion sensor is symmetric about its longitudinal axis and has a center of gravity coincident with its volumetric center.

33. The particle motion sensor of claim 32, wherein the sensing element comprises a three-axis, micro electro-mechanical system accelerometer.

34. The particle motion sensor of claim 32, wherein the sensing element comprises three single-axis, orthogonally oriented, micro electro-mechanical system accelerometers.

35. The particle motion sensor of claim 32, wherein the packing material comprises:
a fluid;
a deformable, expanded foam body;
a polymer with added micro-spheres; or
a low density plastic.

36. A particle motion sensor, comprising:
a packing material;
a plurality of components including at least one sensing element, the components being disposed in the packing material in a manner defining an aperture through which a cable may extend;
wherein the sensing element is symmetric about its longitudinal axis and has a center of gravity coincident with its volumetric center.

37. The particle motion sensor of claim 36, wherein the sensing element comprises a velocity meter or an accelerometer.

38. The particle motion sensor of claim 37, wherein the accelerometer comprises a three-axis, micro electro-mechanical system accelerometer.

39. The particle motion sensor of claim 37, wherein the sensing element comprises three single-axis, orthogonally oriented, micro electro-mechanical system accelerometers.

40. The particle motion sensor of claim 36, wherein the packing material comprises: a fluid;
a deformable, expanded foam body;
a polymer with added micro-spheres; or
a low density plastic.

41. The particle motion sensor of claim 36, wherein the cable comprises:
a power lead;
a command and control line; and
a date line.

* * * * *